United States Patent [19]

Badaracco et al.

[11] Patent Number: 4,637,088
[45] Date of Patent: Jan. 20, 1987

[54] TAPE CLEANING MACHINE

[76] Inventors: John A. Badaracco, 21 Kilburn Rd., W. Newton, Mass. 02165; Henry A. Martin, 8 Melo Rd., Woburn, Mass. 01801

[21] Appl. No.: 622,774

[22] Filed: Jun. 20, 1984

[51] Int. Cl.$^4$ .............................................. B08B 11/02
[52] U.S. Cl. .................................. 15/97 R; 15/100; 360/137
[58] Field of Search .............. 15/100, 102, 77, 97 R; 360/128, 137; 134/9

[56] References Cited

U.S. PATENT DOCUMENTS

| | | |
|---|---|---|
| 2,468,198 | 4/1949 | Heller ...................................... 15/100 |
| 2,791,788 | 5/1957 | Hausdorf ................................ 15/100 |
| 3,266,196 | 8/1966 | Barcaro . |
| 3,475,782 | 11/1969 | Teuber . |
| 3,640,293 | 2/1972 | Freedman . |
| 3,701,178 | 10/1972 | Kuntz . |
| 3,827,699 | 8/1974 | Waugh . |
| 3,881,195 | 4/1975 | Onu et al. . |
| 4,009,047 | 2/1977 | Lindsay . |

FOREIGN PATENT DOCUMENTS 425704   3/1975   U.S.S.R. ............................... 15/102

Primary Examiner—Edward L. Roberts
Attorney, Agent, or Firm—Hamilton, Brook, Smith & Reynolds

[57] ABSTRACT

Means for cleaning a band of flexible tape as it moves from a supply reel to a takeup reel in a predetermined path of travel. Included is a pair of cleaning heads 20 and 22 which are engageable with opposite sides of the tape. The heads are initially located in inoperative positions relative to the path of travel. Means 30 and 34 are provided for moving the heads into engagement with the tape to apply cleaning action as it moves from the supply reel to the takeup reel. The heads include wiping surfaces 64 of spun plastic material.

11 Claims, 12 Drawing Figures

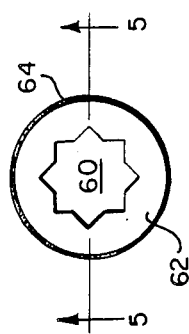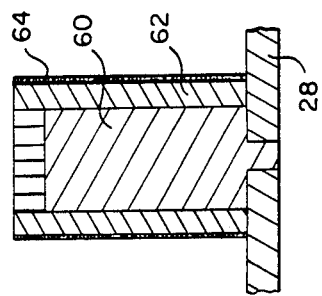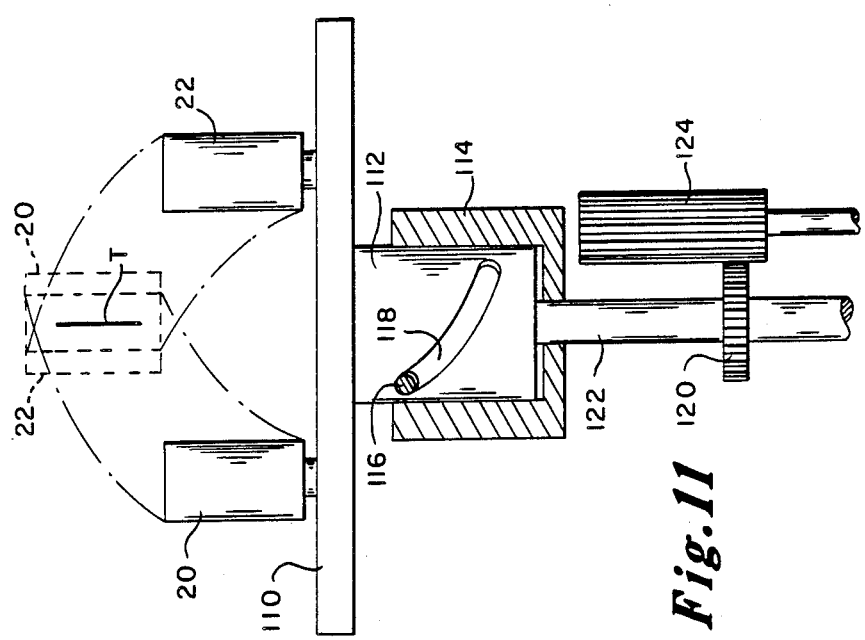

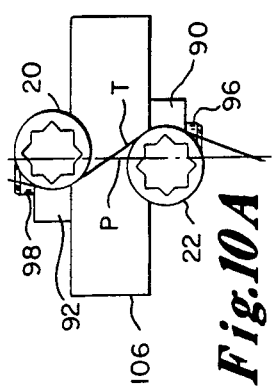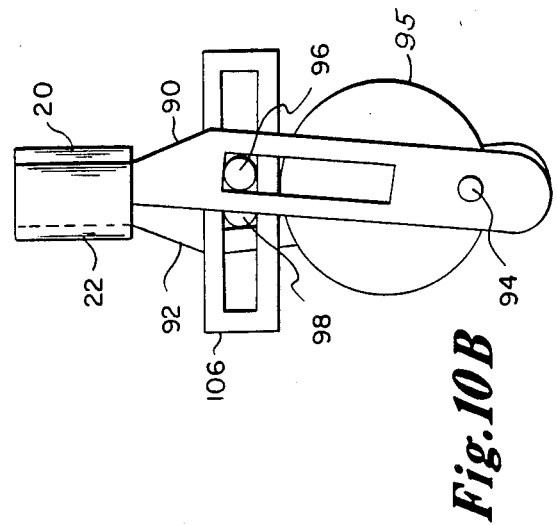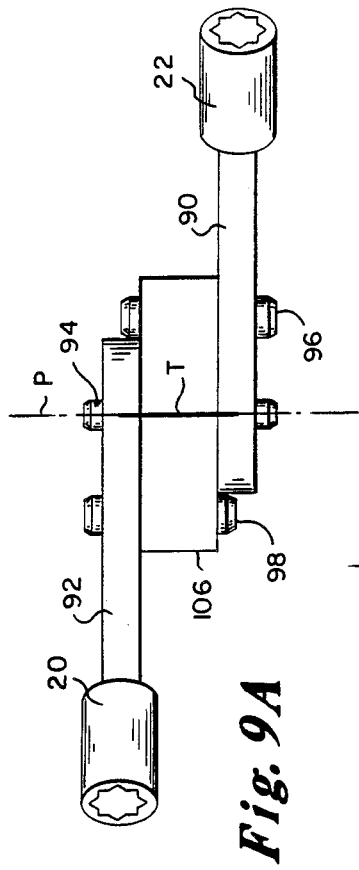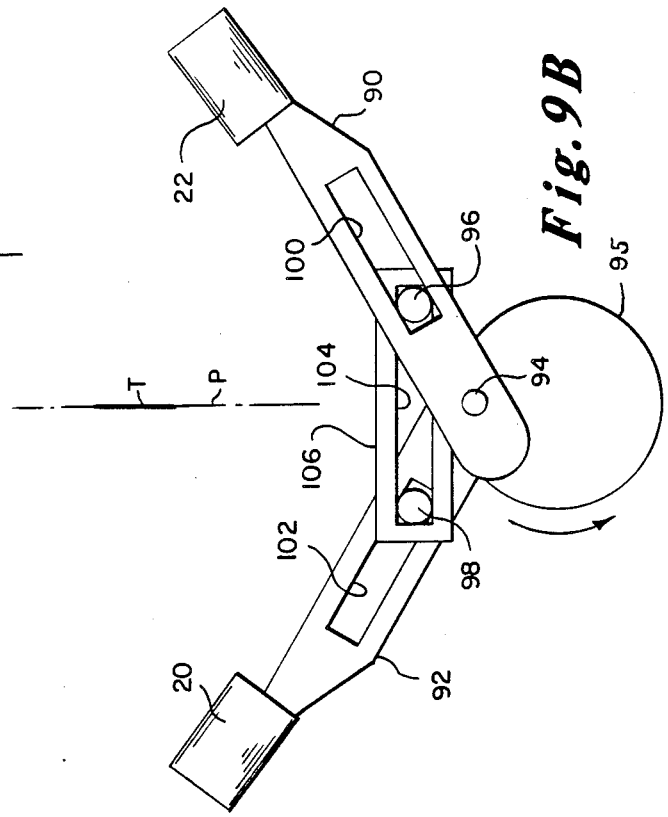

TAPE CLEANING MACHINE

DESCRIPTION

1. Field of Invention

This invention relates to mechanism for cleaning bands of flexible material such as recording tape or photographic film which is supplied in a cassette or other reel-to-reel form.

2. Background of the Invention

Effective mechanism for cleaning of dirt, lint or other debris from flexible bands, whether they be magnetic tapes or photographic films is important in today's high technology. This is because of the enormous number of such tapes which are used over and over again in analog and digital computers, audio and video recording, and photographic recording, etc.

While dirt on photographic film creates a problem for one viewing an image from a film projected onto a screen, the problem created by dirty magnetic tape is much more serious because it can cause errors on the tape which in turn can cause statistical error if the tape is used in conjunction with a computer, for example.

Magnetic tape in use today comprises a plastic base coated with magnetic oxide. Information is recorded on the oxide surface by magnetizing parts of the oxide coating. The reverse takes place during the readout operation when the tape is moved past a readout head and the magnetized spots are detected by the head. During operation, the oxide surface not only picks up contaminants such as dust and dirt, but portions of the oxide itself separate from the surface and accumulate as debris. With the dirt or debris accumulating in its regular stacks or piles, contact with the readout head is lost as the tape travels across it, and even if the distance is extremely small, the readout pulse amplitude is reduced and the information coded onto the tape at that spot is not read.

The problem is emphasized with tape that is used in digital computers. In this case the tapes store high density fields or bits, each one of which is extremely small and occupies a small area of the tape. The bit is actually a magnetic field flux charge change recorded on the oxide surface of the tape. A very small particle accumulation at that area can cause not only an incorrect reading of the bit, but also of a string of bits called a bite.

Various methods have been employed in cleaning tapes or photographic film such as sonic cleaners or solvents. These techniques generally require removing the tape, be it on a cassette or on a pair of reels, from the machine in which it is used. This is because the sonic cleaners are too large to be incorporated in or used in conjunction with the recording or reading apparatus. When using solvents the tape has to be rewound to avoid the contaminating the apparatus with the solvents.

Another mechanical solution has been employed, that being the use of a scraper blade over which the tape is drawn. With this type of device, the blade soon becomes dull and has to be replaced frequently. This is due primarily to the hardness of the oxide coating on the tape. Another problem occurs because the oxide particles tend to accumulate on the blade and in turn must be removed.

A solution to the scraper blade problem has been proposed in the use of rotary blades. While they tend to remove the dirt or oxide particles, they create a residue which has to be removed generally by blowing or suction. This requires ancillary equipment which is not particularly adaptable to incorporation within the recording or reading device in which the tape is employed.

Other solutions have been proposed including the use of rotary brushes. While they are capable of brushing loose particles off the tape, a loop of tape must be removed from the cartridge in which it is stored and brought to the brushes, again requiring either ancillary equipment or equipment which is employed for the cleaning process completely independently of the device in which the tape is being used.

One of the objects of this invention is to provide a tape-cleaning mechanism which overcomes the above-described shortcomings of the prior art cleaning devices and which may be employed as an integral part of the apparatus in which the tape is used.

DISCLOSURE OF THE INVENTION

The invention is embodiable in any machine which utilizes a band of flexible material which moves from a supply reel to a takeup reel in a predetermined path of travel. Such machines could be a photographic film rewinder, a cassette rewinder, a video cassette recorder and player, or any other mechanism where a flexible band moves from supply reel to takeup reel. Means are provided for locating the supply reel and the takeup reel in the machine to be utilized for their intended purposes, either to record, read, project, or any other purpose.

Means for cleaning the band are provided and comprise a first cleaning head engageable with one side of the tape or band and a second cleaning head engageable with the other. The cleaning means are located in inoperative positions relative to the path of travel of the tape in an inoperative cleaning position.

Means are also provided for moving the heads to intersect the path of travel of the tape and engage it to apply cleaning action simultaneously to both sides as it moves from the supply reel to the takeup reel.

The heads, as distinguished from being scraping knives, wipe the moving tape with a soft, flexible spun-plastic cleaning material, which may be supplied continuously, or the heads can be turned to present clean portions of the wiping material when used portions become contaminated.

The above and other features of the invention including various novel details of construction and combinations of parts, will now be more particularly described with reference to the accompanying drawings and pointed out in the claims. It will be understood that the particular tape cleaning mechanism embodying the invention is shown by way of illustration only and not as a limitation of the invention. The principle features of this invention may be employed in varied and numerous embodiments without departing from the scope of the invention.

DESCRIPTION OF FIGURES

FIG. 5. is a sectional view taken along the line of 5 5 of FIG. 6.

FIG. 6 is a detailed elevational view of one of the cleaning heads.

FIG. 9A is a plan view of another embodiment of the invention in inoperative position.

FIG. 9B is a front elevation of the embodiment shown in FIG. 9A.

FIG. 10 is a plan view of the embodiment of FIG. 9A in operative position.

FIG. 10b is a side elevation of the embodiment shown in FIG. 9A in tape cleaning position.

FIG. 11 is yet another embodiment of the invention.

BEST MODE OF CARRYING OUT THE INVENTION

Figure 1:
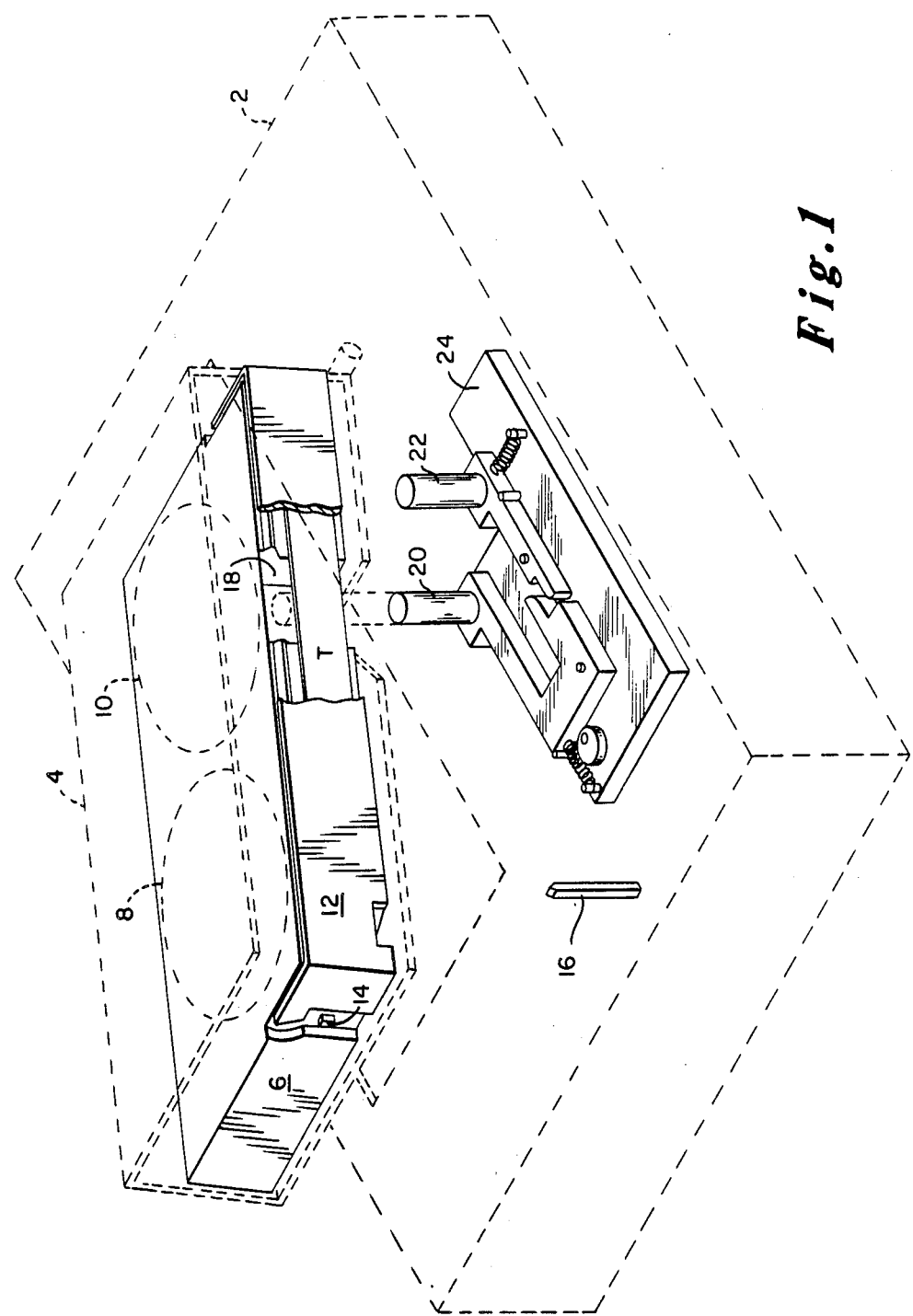
FIG. 1 is a perspective view with portions shown in dotted outline of a tape rewinding mechanism containing a cassette ready to be loaded and embodying the features of the present invention.
Figure 2:
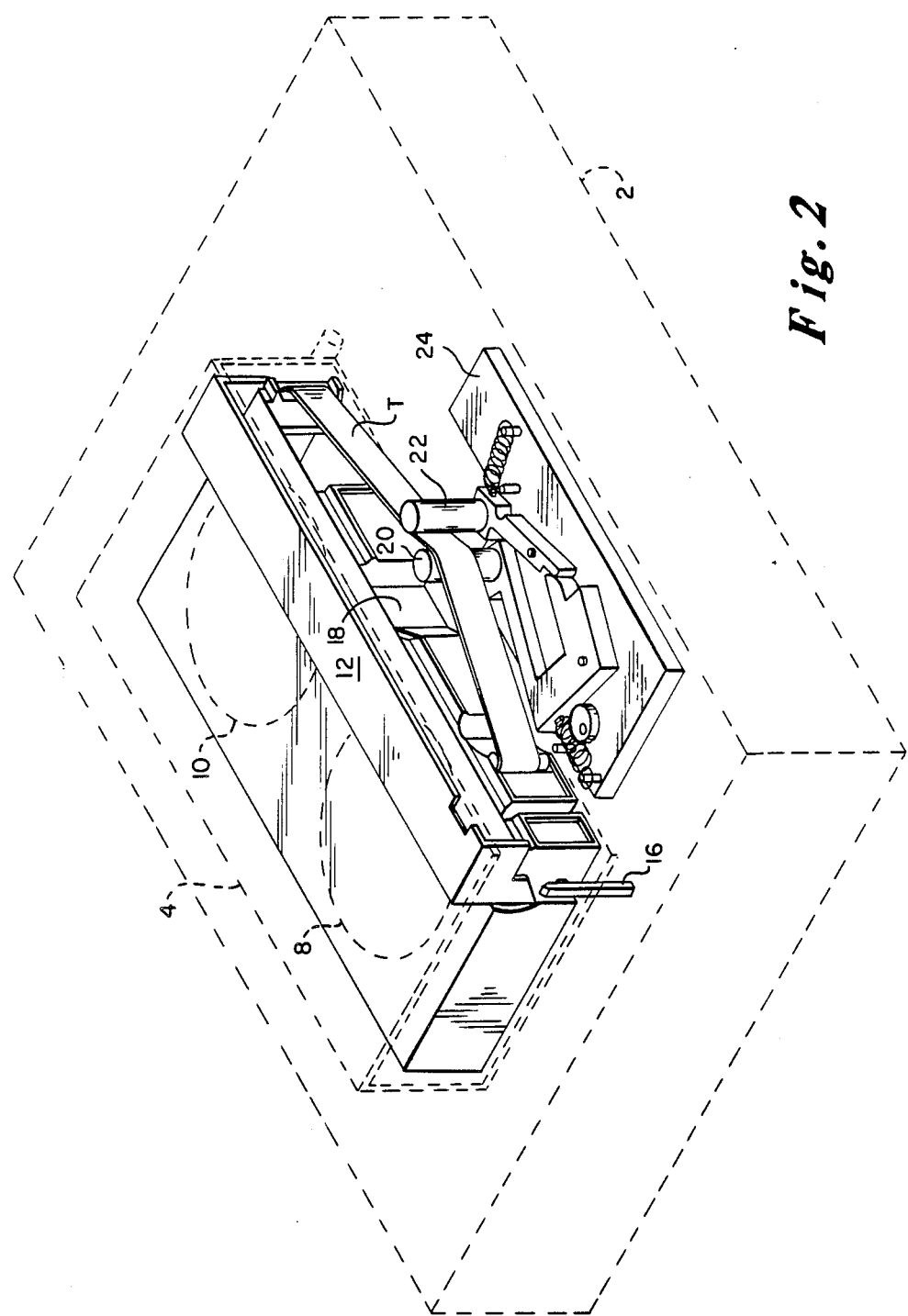
FIG. 2 is a view similar to FIG. 1 with the tape cleaning mechanism in operative position.

The invention will now be described as embodied in an audio-visual cassette rewinding mechanism of the type made for sale to the consuming public or to establishments which rent such cassettes and find need to rewind and clean the tapes after a rental. The rewind mechanism broadly designated 2, is shown in FIGS. 1 and 2, and includes a hinged guideway 4 which is pivotal from an upper loading position, as shown in FIG. 1, to a closed operating position, shown in FIG. 2. The guideway 4 is designed to receive a standard video cassette of the type used in home video cassette recorders used in conjunction with television sets. An example of such a cassette is a BASF E 240 chromdioxide cassette sold by BASF Systems Corporation of Bedford, Massachusetts. The cassette has a plastic case 6 containing two spools 8 and 10 on which oxide tape is wound with the oxide surface on the outer side of the tape. The spools serve alternatively as the supply and take-up reels. The cassette has a hinged cover 12 to protect the tape. It is normally in closed position as shown in FIG. 1. When such a cassette is moved into operative position in a video cassette recorder (hereafter VCR) the cover 12 is automatically opened to the position shown in FIG. 2 when a release latch 14 is opened by a cam 16 in the rewinder 2. While it is not normally necessary to open this cover 12 when the cassette is in a rewinder merely to be rewound, it is shown open for illustrative purposes since opening is necessary for cleaning whether the cassette be in a VCR or rewinder.

A recess 18 is located in the cassette behind the cover to allow mechanism within a VCR to gain access to the back side or non-sensitized surface of the type to bring it to a recording head.

One embodiment of applicants' tape cleaning mechanism will now be described with particular reference to FIGS. 3 and 4. A pair of tape cleaning heads 20 and 22, (which will be described in greater detail hereinafter, are mounted for arcuate motion on a base 24 relative to and transversely of the path of travel, P of the tape, T. The head 20 is mounted at the end of an arm 28 which is part of a U shaped bracket 30 mounted for pivotal movement on a stud 32 on the base 24. The head 22 is mounted on an arm 34 which is mounted for pivotal movement on a stud 36 on the base 24. The arms 28 and 34 hence the heads 20 and 22 are normally held in the FIG. 3 or inoperative position against stops 38 and 40 by springs 42 and 44.

Figure 3:
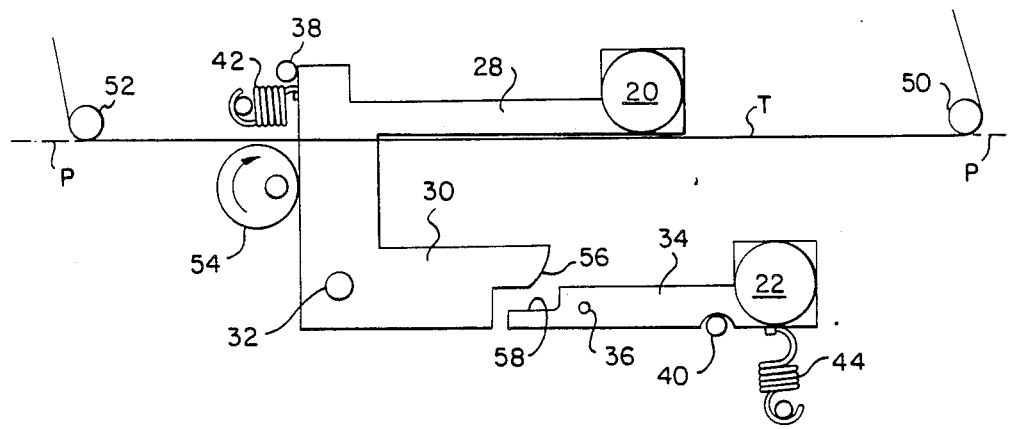
FIG. 3 is a detailed plan view of the tape cleaning heads in inoperative position.

In the FIG. 3 or inoperative position the cleaning head 20 occupies a position close to but not touching the inner surface of the tape and the cleaning head 22 is located some distance away from the outer surface of the tape so as not to interfere with the rewinding of the tape if it is desired not to clean it at that time or the replaying or recording of the tape if it is in a VCR.

Figure 4:
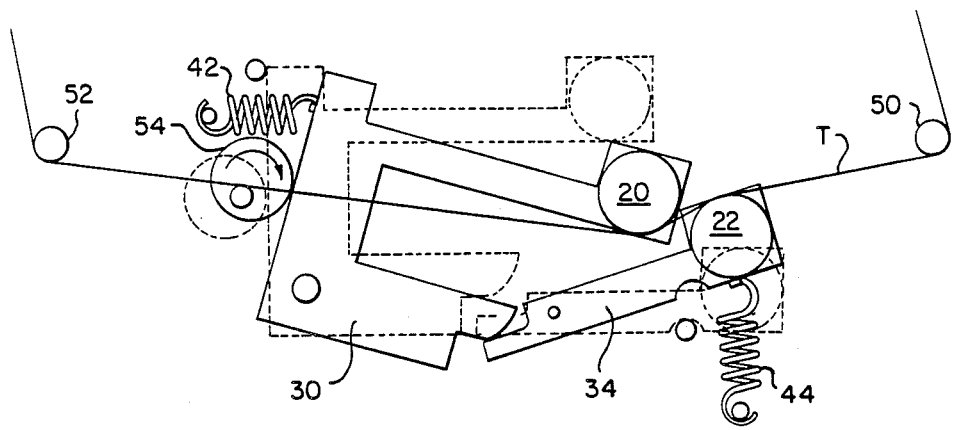
FIG. 4 is a detailed view of the mechanism shown in FIG. 3 in operative position.

When it is desired to clean the tape, a cam 54 mounted on the base 24 is rotated in a clockwise direction as shown by the arrow in FIG. 3 and 4. There are mating cam surfaces 56 and 58 on the pivotal arms 30 and 34, respectively. This motion pivots the arms 30 and 34 from the FIG. 3 position, which is also represented by the dotted line position FIG. 4, to the solid line position in FIG. 4. Since the heads move transversely of the path of travel, P, upon crossing it, the tape is thus moved out of path of P into the position shown in FIG. 4 with the cleaning head 20 pressing gently against the inner surface of the tape and the cleaning head 22 pressing against the outer surface, the tape bending around the heads at an angle of approximately 15 degrees. The rewind mechanism is then turned on and the tape is wound onto one spool as it unwinds from the other with both sides simultaneously being wiped clean by the heads 20 and 22. When the tape has been fully rewound the cam 54 is rotated into its original position and the heads are moved back to FIG. 3 or inoperative position by the springs 42 and 44. The cassette may then be removed from the rewind mechanism when the guideway is raised.

The cleaning heads 20 and 22 will now be described with reference to FIGS. 5 and 6. Each head includes a stud 60 projecting upwardly from the arm with which the head is assooiated. The stud is splined (as seen in FIG. 6) and slidably mounted on the stud is a spool or cylinder 62 of cardboard, plastic or the like. The outer surface of the sleeve 62 is wrapped with a layer 64 of spun nylon wiping material in tape form which may be applied either as a single layer or wrapped as a plurality of layers. One example of material of this type is called Pellon and is sold by the Pellon Corporation of Chelmsford, Massachusetts.

When an arcuate segment of the wiping material 64 has become contaminated the sleeve 62 is removed from the stud 60 and rotated to present a new arcuate portion and then again placed down on the spline. If there are a plurality of wraps of wiping material, the outer contamin° ated surface would be unwound and cut off exposing a clean layer.

Figure 7:
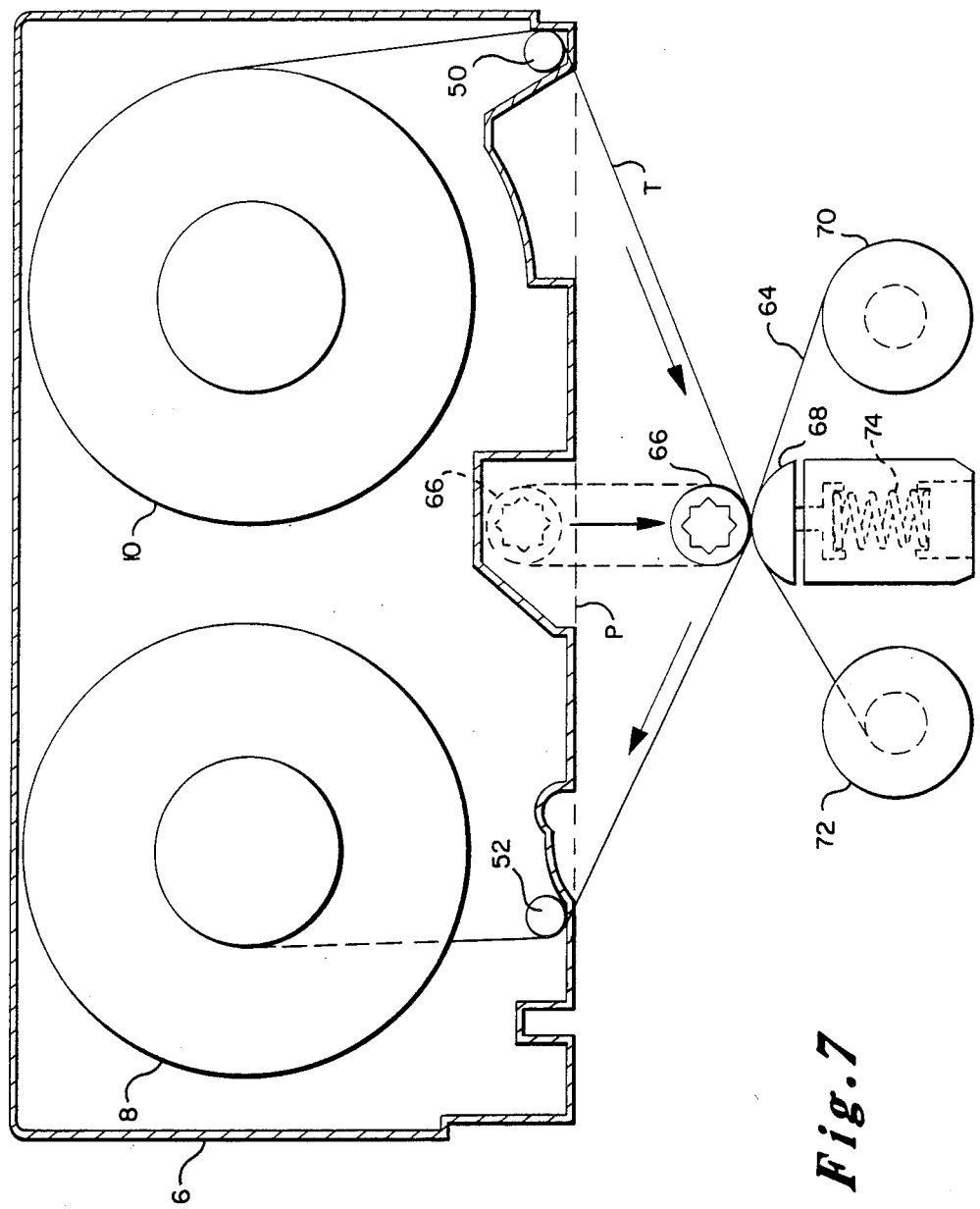
FIG. 7 is a planned schematic view of another embodiment of the invention.

An alternative construction of the cleaning head mechanism will now be described with reference to FIG. 7. A cassette 6 containing a wound reel 10 of magnetic tape and an empty reel 8 is represented as being located in a VCR or a rewind mechanism or any other apparatus which handles tape in cassette form, Tape T is threaded around a guide 50, across the face of the cassette, occupying the dotted line position P which is its normal path of travel, thence around a second guide 52 and onto the takeup spool 8. As the cassette is inserted into a rewinder of the type shown in FIGS. 1 and 2, the recess 18 in the cassette moves down and over a cleaning head 66 having the same characteristics as the heads shown in FIGS. 5 and 6. It then faces the non-sensitized inner surface of the tape but doesn't touch it. Positioned outside of the cassette is a second cleaning head 68 which faces the oxide or outer surface of the tape.

The wiping material 64 is wound on a spool 70 and passes around the head 68 to takeup spool 72. The spools may either be continuously driven to provide a continuously clean wiping surface 68, or incrementally advanced each time a segment becomes contaminated.

Figure 8:
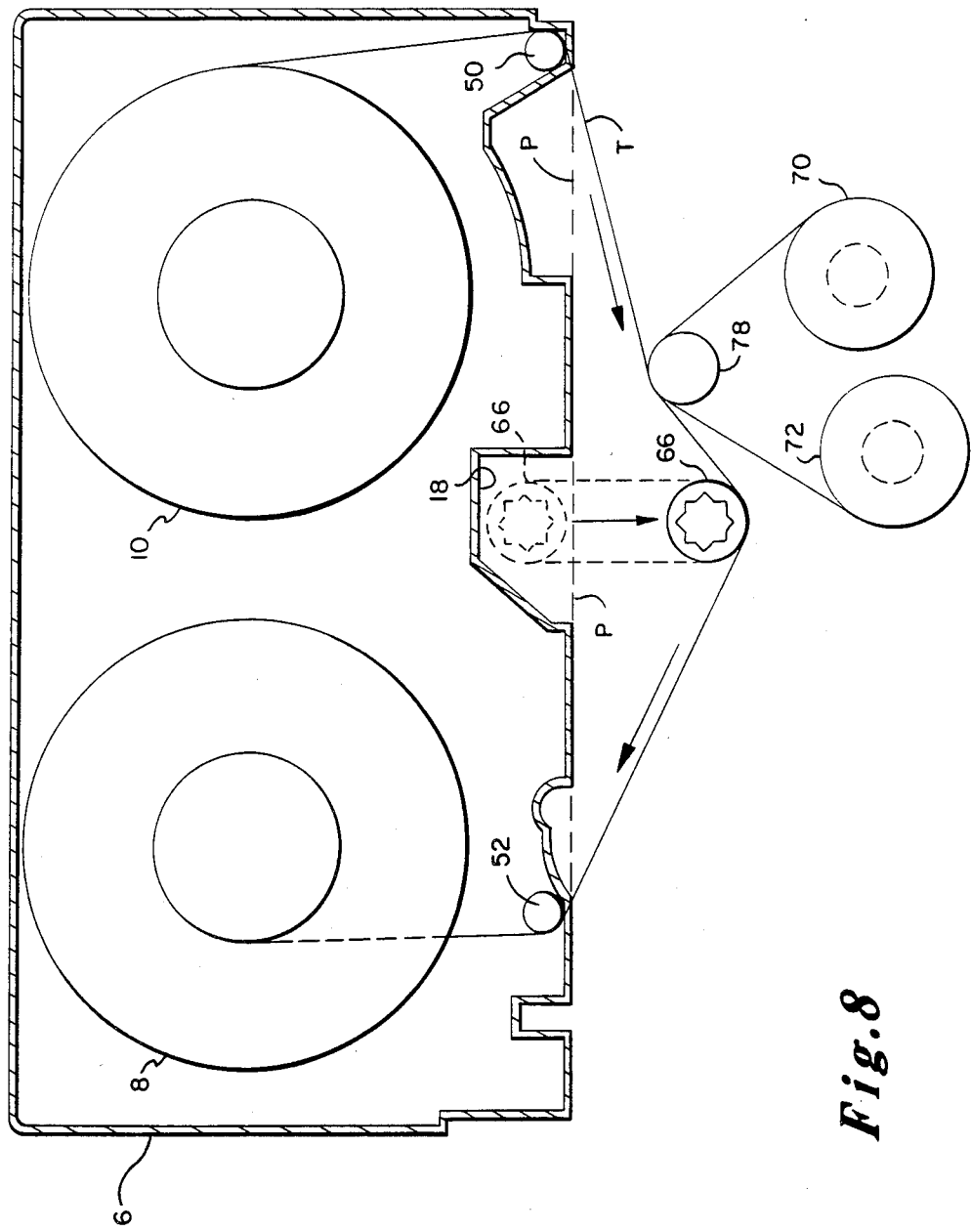
FIG. 8 is a schematic plan view of yet another embodiment of the invention.

When it is desired to clean the tape, the head 66 is actuated by any convenient means not shown and moves outwardly from the cassette in a linear path normal to the predetermined path and in the direction of the arrow. It engages the tape moving it outwardly gently pressing its wiping material 64 against the inner surface of the tape. It presses the other side of the tape gently against a head 68 located in its linear path and which is maintained in yieldable position by a spring 74. When the tape has been cleaned, head 66 is caused to reverse its direction and move into its original position wherein the tape may be recorded, played or the cassette removed from the machine.

Where space limitations in a VCR or the like may present an obstacle to the positioning of the cleaning head 68 in the linear path of the head, 66, the wiping material 64 may be located laterally of the path as shown in FIG. 8. In this alternative construction, the wiping spool 70 is located laterally of the path of movement of the head 66 as is the takeup spool 72. The wiping material passes around a roller 78. When head 66 is moved to the extended position shown in FIG. 8, it bends the tape T slightly around the roller 78 while being cleaned and the tape is reversed in direction again by the head 66, while the inner surface is being cleaned.

Another construction of wiper head configuration will now be described with reference to FIGS. 9A, 9B, 10A and 10B. Again where space limitations dictate, it may be necessary to locate the heads some distance laterally of the path of the tape. FIGS. 9A to 10B describe mechanisms for moving the cleaning heads 20 and 22 into operative cleaning position in an arcuate path as distinguished from linear. As viewed in FIG. 9A, the tape is movable in the path P from the top of the figure to the bottom or visa versa. As seen in FIG. 9B the tape is moving in path P into or away from the plane of the drawing. Heads 20 and 22 are mounted at the ends of arms 90 and 92 which are pivotely mounted on a pin 94 and secured excentrically on a cam 95. Rollers 96 and 98 are received within slots 100 and 102 in arms 90 and 92, respectively. The rollers are also received within a slot 104 in a fixed guideway 106.

The heads normally occupy the positions shown in FIGS. 9A and 9B facing opposite sides of the tape T. When it is desired to clean the tape, the cam 95 is rotated in a counterclockwise direction as indicated by the arrow in FIG. 9B. The heads 20 and 22 pivot downwardly and inwardly because the arms pivot on the pin 94 with the rollers 96 and 98 moving toward each other in the slot 104 and concurrently outwardly in the slots 100 and 102 until the heads occupy the position, shown in FIG. 10B. In this position the heads 20, 22 are slightly overlapped, having engaged the sensitized and nonsensitized surfaces of the tape. The cleaning process is then begun.

There are other instances where space limitations dictate the inoperative position of the cleaning heads. Mechanism will now be described with reference to FIG. 11 which simultaneously elevates the cleaning heads, which are normally located below the path of travel of the tape and simultaneously rotate them into cleaning position.

The heads are mounted on a bar 110 which is attached to the top of a cylinder 112 contained within a fixed circular guide member 114. A pin is fixed in the circular guide member 114 and projects inwardly into an arcuate slot 118 in the cylinder 112. A gear 120 is fixed to a shaft 122 which projects downwardly from the cylinder 112 and through an opening in the bottom of the guide member 114. A driving gear 124 engages the gear 120 on the shaft 122. The heads 20 and 22, normally occupy the positions shown in FIG. 11, which is both below and spaced laterally of the tape T. When it is desired to clean the tape, the gear 124 is rotated which, in turn, causes the gear 120 and the cylinder 112 to rotate and hence the heads 20 and 22 are rotated. Because the pin 116 in the fixed guide engages the then moving arcuate slot 118, the cylinder 112 rises and lifts the bar 110 and the heads toward the tape T while simultaneously the heads are pivoted inwardly to engage the tape.

When cleaning has been accomplished, the cleaning heads are returned to their original positions and the tape can be recorded, read or played.

We claim:

1. In combination:
   a cassette handling machine, a cassette having a band of flexible tape which is moveable from a supply reel to a take-up reel in a predetermined path;
   means for locating the cassette in normal operative position in the machine;
   means for cleaning the tape while the cassette is in the machine and the tape is moving from reel to reel;
   said means for cleaning comprising heads engageable with opposite sides of the tape and located, relative to the normal operating position of the cassette, in inoperative cleaning positions and out of contact with the tape; and,
   means for moving the heads into engagement with the tape to apply cleaning action simultaneously to both sides of the tape as it moves from reel to reel.

2. Cleaning means according to claim 1 wherein the heads are mounted on arms for arcuate motion transversly of the predetermined path.

3. Cleaning means according to claim 1 wherein the heads are mounted on arms for arcuate motion transversely of the predetermined path and a selectively operable cam moves the arms.

4. Cleaning means according to claim 1 wherein the first cleaning head moves normal to the predetermined path of travel in a linear path.

5. Cleaning means according to claim 1 wherein tne first cleaning head moves normal to the predetermined path of travel in a linear path, and the second cleaning head is located in the linear path of travel of the first cleaning head.

6. Cleaning means according to claim 1 wherein the first cleaning head moves normal to the predetermined path of travel in a linear path and wherein the second cleaning head is located in offset relationship to the linear path of the first cleaning head.

7. Cleaning means according to claim 1 wherein the heads are mounted for arcuate motion on arms which pivot about an axis parallel to the predetermined path.

8. Cleaning means according to claim 1 wherein the arms are mounted for both arcuate motion transversely of the predetermined path and simultaneously upwardly from the inoperative position which is located below the predetermined path.

9. In combination with a cassette handling machine, a cassette having a band of flexible tape which is moveable from a supply reel to a take-up reel in a predetermined path which is the normal operating position of the band, means for locating the cassette in normal operating position in the handling machine, means for cleaning the band comprising:
  a first cleaning head engageable with one side of the band;
  a second cleaning head engageable with the opposite side of the band;
  the cleaning heads having a replaceable wiping surface in the form of a tape of spun plastic cleaning material; and
  means for selectively moving the heads from a first inoperative position wherein they are both out of engagement with the band when it is in its normal operating position, to a second operative cleaning position in which they are in engagement with both sides of the band.

10. Means for cleaning a band according to claim 9 wherein the heads include at least one removeable cylindrical member the outer surface of which is the wiping surface.

11. Means for cleaning a band according to claim 9 wherein the heads include at least one removeable cylindrical member and outer surface of which is the wiping surface; and,
  means for rotating the cylindrical member to reposition contaminated portions of its wiping surface.

* * * * *